(12) United States Patent
Strauss

(10) Patent No.: US 8,029,295 B2
(45) Date of Patent: Oct. 4, 2011

(54) CONNECTOR FOR AN ELECTRICAL CIRCUIT EMBEDDED IN A COMPOSITE STRUCTURE

(75) Inventor: William C. Strauss, Flower Mound, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/966,635

(22) Filed: Dec. 13, 2010

(65) Prior Publication Data

US 2011/0080712 A1 Apr. 7, 2011

Related U.S. Application Data

(62) Division of application No. 12/122,428, filed on May 16, 2008, now Pat. No. 7,862,348.

(60) Provisional application No. 60/930,712, filed on May 17, 2007.

(51) Int. Cl.
*H01R 12/00* (2006.01)
(52) U.S. Cl. .......................... 439/83; 29/883
(58) Field of Classification Search .................. 439/83, 439/63, 78, 79, 931, 738, 781; 29/831, 841, 29/855, 866, 876
See application file for complete search history.

(56) References Cited

U.S. PATENT DOCUMENTS

| | | | | |
|---|---|---|---|---|
| 3,740,702 A * | 6/1973 | Moray | ............................ | 439/866 |
| 3,744,128 A * | 7/1973 | Fisher et al. | .................... | 29/858 |
| 4,012,093 A * | 3/1977 | Crane | ............................. | 439/67 |
| 4,526,432 A | 7/1985 | Cronin et al. | | |
| 4,815,986 A * | 3/1989 | Dholoo | ......................... | 439/248 |
| 4,985,601 A * | 1/1991 | Hagner | ......................... | 174/261 |
| 4,995,815 A * | 2/1991 | Buchanan et al. | ............... | 439/63 |
| 5,041,015 A * | 8/1991 | Travis | ........................... | 439/492 |
| 5,044,990 A * | 9/1991 | Knotts | ........................... | 439/578 |
| 5,104,325 A * | 4/1992 | Mitani et al. | .................... | 439/63 |
| 5,127,382 A * | 7/1992 | Imoehl | ........................... | 123/470 |
| 5,145,382 A | 9/1992 | Dickirson | | |
| 5,247,424 A * | 9/1993 | Harris et al. | ................... | 361/704 |
| 5,281,762 A * | 1/1994 | Long et al. | ....................... | 174/78 |
| 5,413,504 A | 5/1995 | Kloecker et al. | | |
| 5,735,697 A * | 4/1998 | Muzslay | ........................ | 439/83 |
| 5,853,295 A * | 12/1998 | Rosenberger | ................... | 439/63 |
| 6,214,525 B1 * | 4/2001 | Boyko et al. | .................. | 430/313 |
| 6,482,045 B2 * | 11/2002 | Arai | | |
| 6,491,529 B2 * | 12/2002 | Gray et al. | | |
| 6,515,228 B2 * | 2/2003 | Albert et al. | ................... | 174/525 |
| 6,948,977 B1 * | 9/2005 | Behrent | | |

(Continued)

FOREIGN PATENT DOCUMENTS

WO WO 2004/026011 3/2004

(Continued)

OTHER PUBLICATIONS

U.S. Appl. No. 12/022,759, entitled "Fault Tolerant Heater Circuit," 22 pages, Jan. 30, 2008.

(Continued)

*Primary Examiner* — Michael Zarroli
*Assistant Examiner* — Harshad C. Patel
(74) *Attorney, Agent, or Firm* — Baker Botts L.L.P.

(57) ABSTRACT

According to one embodiment, a connector for a composite structure includes at least one conducting element that is coupled to a node of an electrical circuit embedded in a composite structure. The composite structure has two opposing surfaces in which the conducting element is disposed essentially between the surfaces of the composite structure.

19 Claims, 3 Drawing Sheets

U.S. PATENT DOCUMENTS

| | | | |
|---|---|---|---|
| 2002/0001984 A1* | 1/2002 | Franzen et al. | 439/78 |
| 2002/0187681 A1* | 12/2002 | Brancaleone | 439/638 |
| 2003/0134455 A1* | 7/2003 | Cheng et al. | 438/125 |
| 2004/0008532 A1* | 1/2004 | Asawa | |
| 2006/0001192 A1* | 1/2006 | Oohashi et al. | |
| 2006/0009075 A1* | 1/2006 | Nagata et al. | 439/581 |
| 2008/0176439 A1* | 7/2008 | Chen et al. | 439/345 |

FOREIGN PATENT DOCUMENTS

| | | |
|---|---|---|
| WO | WO 2006/069996 | 7/2006 |

OTHER PUBLICATIONS

PCT Notification of Transmittal of the International Search Report and the Written Opinion of the International Searching Authority, or the Declaration for International Application No. PCT/US2008/063876, 10 pages, Sep. 7, 2008.

European Patent Office, Communication Pursuant to Article 94(3) EPC, Application No. 09 755 678.3-1231, Ref. No. JL53733P.EPP, Jun. 7, 2010, 4 pages.

* cited by examiner

CONNECTOR FOR AN ELECTRICAL CIRCUIT EMBEDDED IN A COMPOSITE STRUCTURE

RELATED APPLICATIONS

This application is a divisional application of U.S. application Ser. No. 12/122,428, entitled "CONNECTOR FOR ELECTRICAL CIRCUIT EMBEDDED IN A COMPOSITE STRUCTURE," which was filed May 16, 2008.

U.S. application Ser. No. 12/122,428 claims priority to U.S. Provisional Patent Application Ser. No. 60/930,712, entitled "CONNECTOR FOR AND ELECTRICAL CIRCUIT EMBEDDED IN A COMPOSITE STRUCTURE," which was filed on May 17, 2007.

GOVERNMENT RIGHTS

This invention was made with Government support under contract number N00024-05-C-5346 DDG 1000. The Government may have certain rights in this invention.

TECHNICAL FIELD OF THE DISCLOSURE

This disclosure generally relates to electrical connectors, and more particularly, to a connector for an electrical circuit embedded in a composite structure and method for fabricating the same.

BACKGROUND OF THE DISCLOSURE

Electrical circuits may be embedded in composite structures for various purposes. Examples of such electrical circuits may include resistive heater circuits for ice-inhibition, active electrical polarizers or filters, sensor circuits for in situ structural inspection and diagnostics, conformal antennae, lightning and/or static EMF protection or diversion, as well as numerous other applications. Embedding electrical circuits within composite structures may provide protection for the electrical circuit while enhancing the utility of the composite structure with which it is integrally formed.

SUMMARY OF THE DISCLOSURE

According to one embodiment, a connector for a composite structure includes at least one conducting element that is coupled to a node of an electrical circuit embedded in a composite structure. The composite structure has two opposing surfaces in which the conducting element is disposed essentially between the surfaces of the composite structure.

Technical advantages of particular embodiments of the present disclosure include a connector for a composite structure and fabrication method that may minimize impacts upon the composite structure's form while enhancing damage avoidance for the connector. Damage avoidance may be provided by a connector having electrically conductive elements and an optional shroud that is disposed within the body of the composite structure such that it is protected from physical impact with external objects. In some embodiments, electrically conductive elements and/or shroud may extend slightly above or slightly below the surface of the composite structure. In particular embodiments fabricated according to a lay-up process, the composite structure may be subjected to various post-fabrication processes, such as machining or the addition of additional layers of material. Placement of the connector and its associated components within the body of the composite structure provides protection for the connector during these potentially damaging post-fabrication processes.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Many applications for electrical circuits embedded in composite structures are currently in use. In the aerospace and electronics industries for example, radomes, antenna arrays, electronic enclosures, helicopter blades, wing leading edges, spars, ribs, longerons, and the like may employ embedded various types of electrical circuits to provide some useful function. Electrical connection to electrical circuits embedded in composite structures has been problematic, however, in that integration of connectors to the electrical circuits being accomplished using complex tooling and equipment with injection molding processes. Unfortunately, injection molding processes may not be well suited to fabrication of large, highly stressed composite structures or panels. In many cases, the state of the art has forgone integration of active, printed circuits into large composite structures due to difficulties in the integration of connectors to these composite structures.

In some circumstances, printed circuits have been embedded in composite structures with soldered lead wires attached, in which these wires have either been threaded through adjacent composite plies to some molded cavity for connectorization, or they have been extended laterally out through the edge of the composite structure. The later solution may be particularly undesirable because: it may provide a path for moisture ingression and delamination of the panel, it may inhibit final machining or trimming of the composite edge, and it may create a strain point at which the lead wires are likely to bend, fatigue, and eventually break.

A radome is a particular type of composite structure that may use an embedded electrical circuit, such as a heater element that selectively heats its surface for the prevention of icing. In order to actively control the level of heating provided by the heater element, one or more sets of sense traces and/or sensors may be provided that monitors temperatures at various locations on the radome's surface. The radome may be typically fabricated by laminating a number of composite layers of dielectric, fiber reinforced plastic to a specified thickness. These composite layers (or skins) may include low density structural sandwich core materials, embedded electrical circuits, environmental barriers, and/or other functional components.

The fabrication process for radomes may be complicated by the inclusion of an electrical circuit, such as a heater circuit, into the composite structure during fabrication. For example, known radome designs with embedded electrical circuits have been implemented with connectors the are coupled to the electrical circuit using a wire bundle or "pigtail" that dangles from the composite structure. Such designs may be inherently vulnerable to mechanical, environmental, and electrical failure and may limit final machining of the radome following fabrication.

Figure 1:
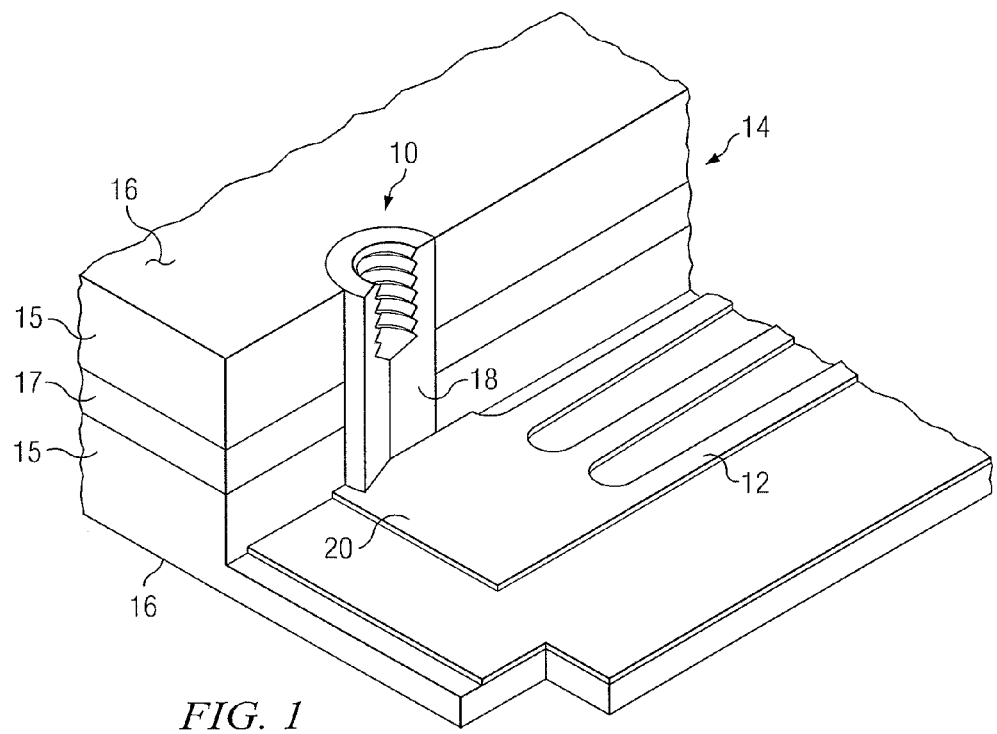
FIG. 1 is a cut-away perspective view of one embodiment of a connector including an internally threaded post for an electrical circuit embedded in a composite structure according to the teachings of the present disclosure.

FIG. 1 shows one embodiment of a connector 10 that may be used to provide electrical connectivity to an electrical circuit 12 embedded in a composite structure 14. Composite structure 14 is generally planar in shape having two opposing surfaces 16. The connector 10 includes an electrically conductive element, which in this particular embodiment is a internally threaded post 18 that is coupled to a node 20 of the electrical circuit 12. According to the teachings of the present disclosure, internally threaded post 18 is disposed essentially between the two opposing surfaces 16 of composite structure 14. That is, internally threaded post 18 does not protrude significantly beyond either surface 16 of composite structure 14. By configuring internally threaded post 18 to remain within the body of the composite structure 14, inadvertent contact with other devices may prevent damage to internally threaded post 18 of connector 10.

Electrically conductive elements of connector 10 may include any suitable type of electrically coupling mechanism. In this particular embodiment, electrically conductive element includes an internally threaded post 18—for attachment of electrical conductors using screws. Node 20 to which internally threaded post 18 is coupled may be any suitable electrical conductor for transferring electrical signals or power from the electrical circuit 12 to internally threaded post 18. In the particular embodiment shown, node 20 is an etched copper foil trace on a printed circuit board embedded in composite structure 14.

Electrical circuit 12 may include any suitable type of electrical circuitry. In the particular embodiment shown, electrical circuit 12 is a heater circuit having copper traces of a specified width that are configured to heat composite structure 14 when driven by sufficient electrical current. Examples of other electrical circuits 12 that may be embedded in composite structure include radiation filters, polarizers, antennae, embedded sensors, lightning diverters, static electro-motive force (EMF) diverters, wicks, and shields.

Composite structure 14 as shown is a radome, however, it should be appreciated that that the teachings of the present disclosure may be applied to any suitable composite structure having an embedded electrical circuit. A surface 16 of the composite structure 14 may provide an environmental barrier for protection of embedded electrical circuit 12, the underlying laminate, and any enclosed electronics, such as antennae covered by the radome. In one embodiment, internally threaded post 18 is electrically coupled to node 20 using known surface mount or through-hole soldering techniques.

In one embodiment, composite structure 14 is formed using a lay-up process. A lay-up process generally refers to a manufacturing technique in which multiple layers of composite material 15 are alternately deposited on one another using a bonding agent 17. Typically, composite structures having a relatively large size are manufactured using the lay-up process.

Figure 2:
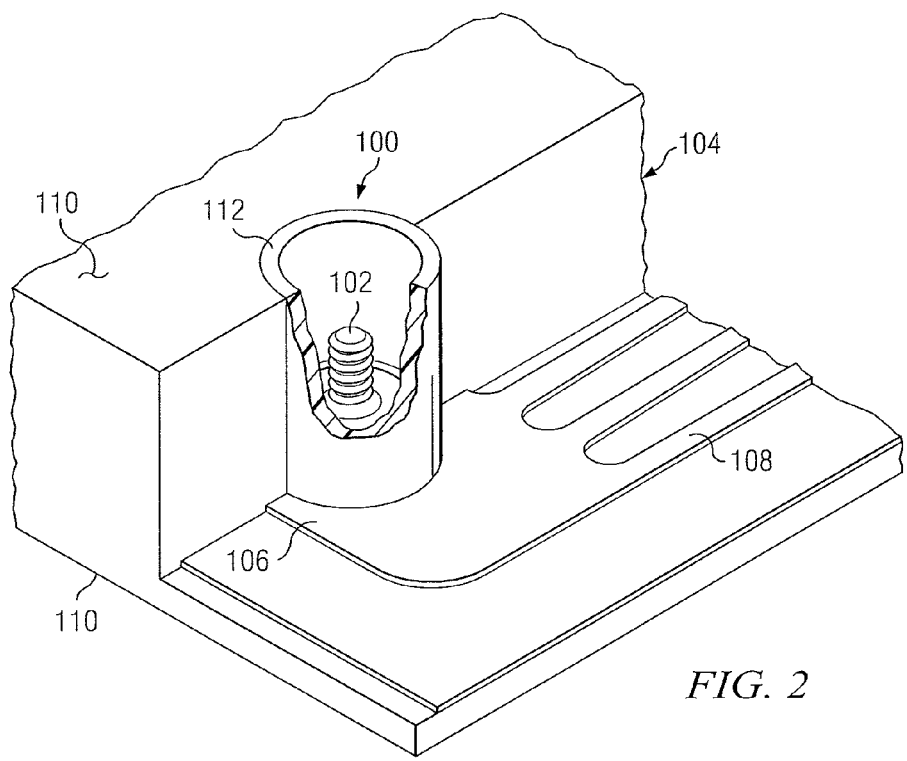
FIG. 2 is a cut-away perspective view of another embodiment of a connector including an externally threaded post for an electrical circuit embedded in a composite structure.

FIG. 2 shows another embodiment of a connector 100 in which electrically conductive element includes an externally threaded post 102 and a dielectric shroud 112 configured in a composite structure 104. Externally threaded post 102 is similar to internally threaded post 18 in that externally threaded post 102 is electrically coupled to a node 106 of an electrical circuit 108 and is disposed between the surfaces 110 of composite structure 104. Externally threaded post 102 differs, however, in that it is surrounded by dielectric shroud 112. In one embodiment, dielectric shroud 112 is formed a non-conducting material, such as a hardened phenolic resin. In some embodiments, dielectric shroud 112 may provide support and shielding for a complementary internally threaded post screwed onto externally threaded post 102. Externally threaded post 102 may be used with any composite structure 14 and electrical circuit 12 as described above.

Figure 3:
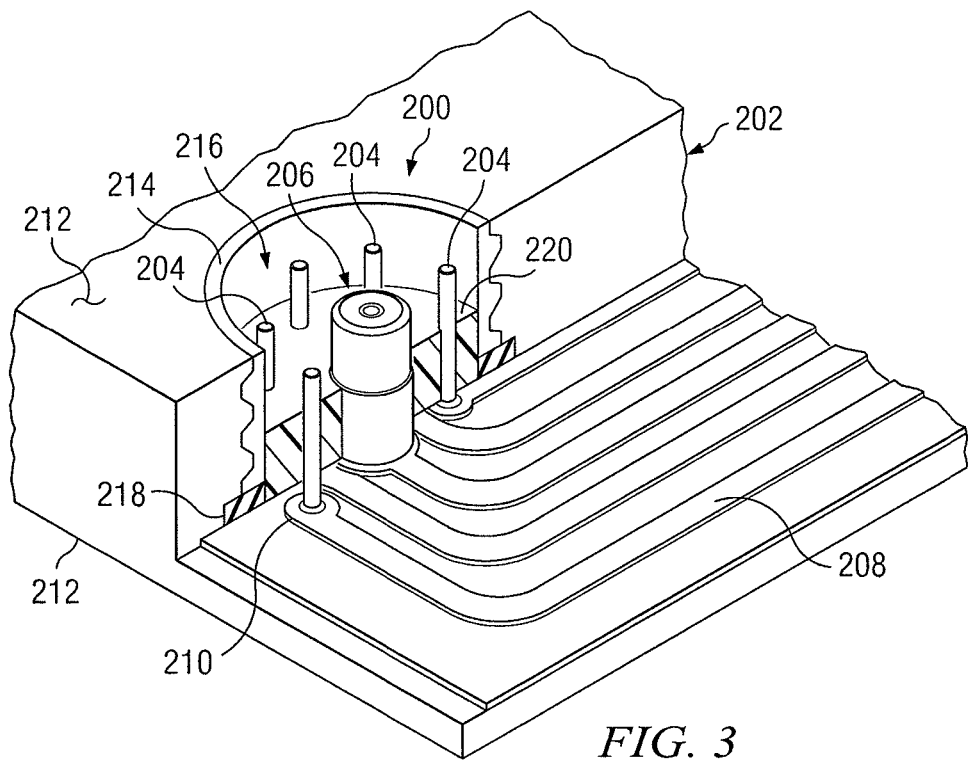
FIG. 3 is a cut-away perspective view of one embodiment of a connector including a number of pins and a co-axial connector encompassed by a shroud for an electrical circuit embedded in a composite structure.

FIG. 3 shows another embodiment of a connector 200 having multiple electrically conductive elements configured in a composite structure 202. In this particular embodiment, electrically conductive elements include a multiple number of pins 204 and a co-axial connector 206. An electrical circuit 208 may include nodes 210 formed of multiple copper traces that may be independently coupled to each pin 204 and co-axial connector 206. Connector 200 including multiple pins 204 and co-axial connector 206 may be used with any composite structure 14 and/or electrical circuit 12 as described above. In a manner similar to the connector 10 of FIG. 1, pins 204 and co-axial connector 206 are disposed between the opposing surfaces 212 of composite structure 202.

In this particular embodiment, connector 200 includes a shroud 214 that encompasses the pins 204 and co-axial connector 206. Shroud 214 forms a cavity 216 into which pins 204 and co-axial connector 206 are placed and operable to accept a complementary plug for interconnection with other electrical circuitry (not shown). Shroud 214 may be formed of any suitable material, such as corrosion resistant steel or other high strength material. If the shroud is formed from an electrically conductive material, an insulating spacer 218 may be implemented to prevent the shroud from electrically contacting nodes 210 and thus prevent an electrical short-circuit condition.

Within the shroud 214 and around the pins 204 and co-axial connector 206, a rigid dielectric terminal block or potting material 220 may be deposited to provide support, and alignment for the pins 204 and co-axial connector 206 and/or to provide a moisture proof seal over the underlying nodes 210. The outer surface of shroud 214 may be knurled or ribbed to enhance mechanical retention within the surrounding composite structure 202. In another embodiment, the inner surface of shroud 214 may be detented or threaded in such a manner to secure the housing of a complementary plug and/or to enhance its blind-mateability to the complementary plug.

Figure 4:
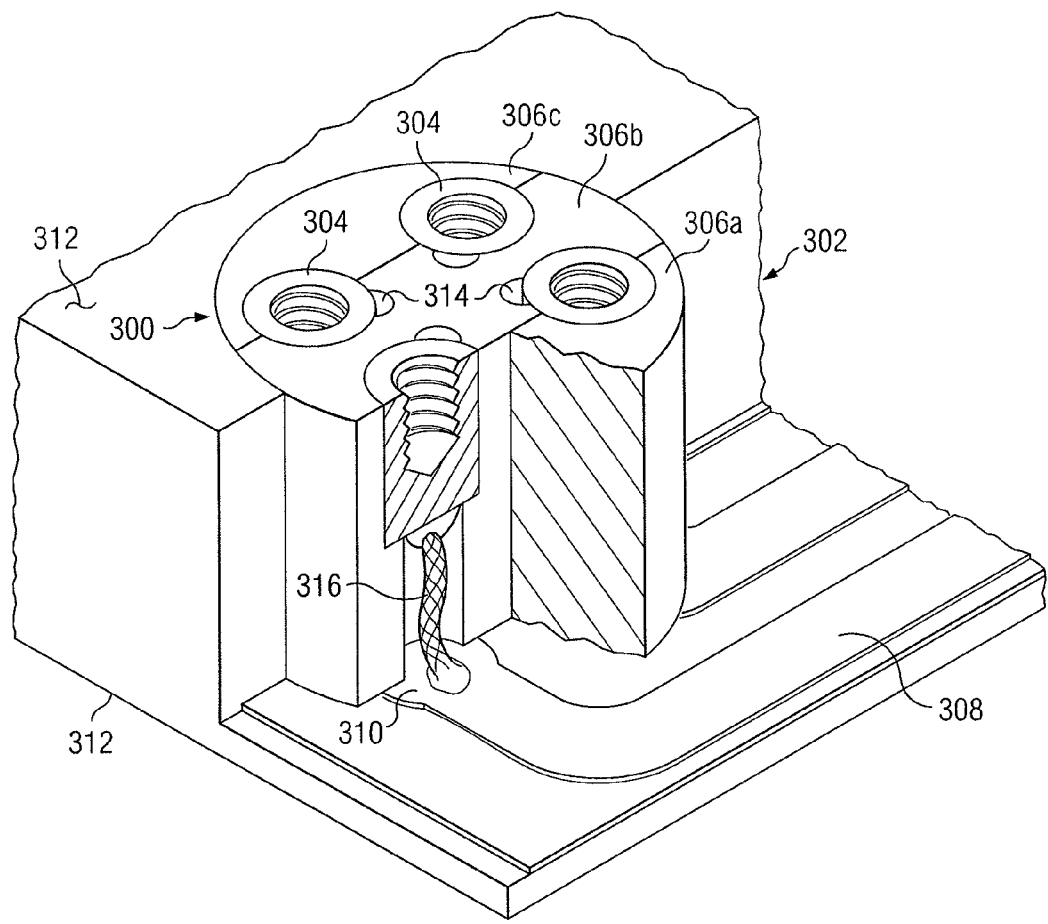
FIG. 4 is a cut-away perspective view of one embodiment of a connector including a number of internally threaded posts configured in a rigid support block for an electrical circuit embedded in a composite structure.

FIG. 4 shows another embodiment of a connector 300 that may be configured within a composite structure 302. In this particular embodiment, connector 300 includes a number of internally threaded posts 304 that are maintained in rigid alignment relative to one another with a rigid support block 306. An electrical circuit 308 includes nodes 310 formed of multiple copper traces that may be independently coupled to each internally threaded post 304. Internally threaded posts 304 configured in rigid support block 306 may be used with any composite structure 14 and/or electrical circuit 12 as described above with respect to the embodiment of FIG. 1. Internally threaded posts 304 configured in rigid support block 306 remains essentially between opposing surfaces 312 of composite structure 302.

Rigid support block 306 may be formed around internally threaded posts 304 using any suitable approach. In one embodiment, rigid support block 306 is formed from three block portions 306a, 306b, and 306c that when placed together, form holes for entrapping the internally threaded posts 304. Rigid support block 306 may be made of any material, such as phenolic resin that may withstand relatively high temperatures.

In one embodiment, rigid support block 306 includes cavities 314 proximate each internally threaded post 304. Following assembly of rigid support block 306 around internally threaded posts 304, a potting compound may be injected into cavities 314 for bonding and/or sealing internally threaded posts 304 against rigid support block 306.

In one embodiment, one or more internally threaded posts 304 may be electrically coupled to its associated node 310 with a flexible wire 316, such as a braided wire. Certain embodiments incorporating electrical interconnection using a flexible wire may provide an advantage in that the flexibility of flexible wire 316 may reduce coupling failure due to flexure of the composite structure 302 relative to the internally threaded post 304. Particular embodiments incorporating flexible wires 316 may permit use of standard length posts 304 in various composite structure designs that vary in thickness. Use of standard post lengths may also enhance solderability due to their relatively common mass in some embodiments.

Modifications, additions, or omissions may be made to connector 10, 100, 200, or 300 without departing from the scope of the disclosure. The operations of connector 10, 100, 200, or 300 may be performed by more, fewer, or other components. For example, if shroud 214 is formed of a non-conductive material, implementation of insulating spacer 218 may not be needed. As used in this document, "each" refers to each member of a set or each member of a subset of a set.

Figure 5:
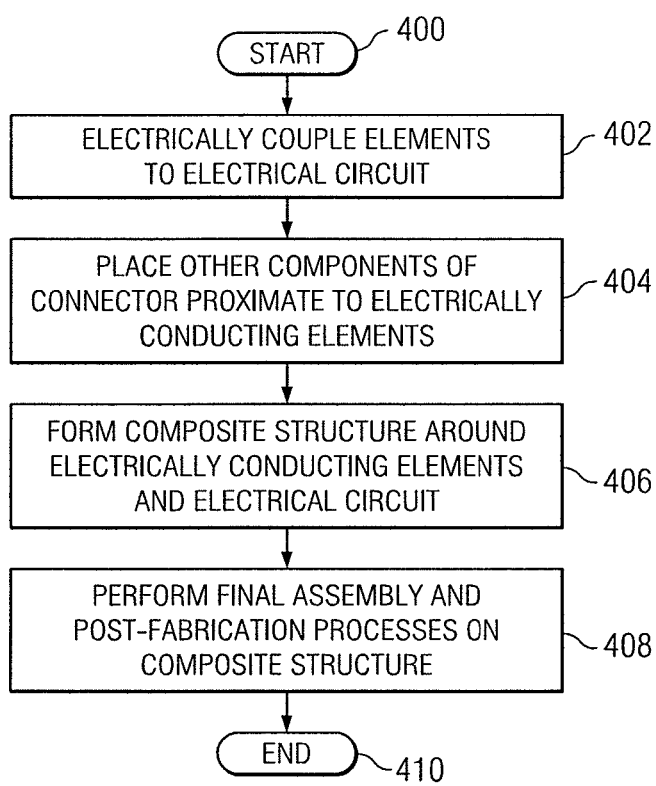
FIG. 5 is a flowchart showing one embodiment of a series of actions that may be performed to fabricate the composite structure of FIG. 1, 2, 3, or 4.

FIG. 5 is a flowchart showing a series of actions that may be performed to fabricate the connector 10, 100, 200, or 300 on composite structure 14, 104, 202, or 302. The process is initiated in act 400. Initiation of the fabrication process may include procuring a electrical circuit 12 and other components used to fabricate the composite structure 14, 104, 202, or 302 and associated connector 10, 100, 200, or 300.

In act 402, one or more electrically conductive elements may be electrically coupled to an electrical circuit 12. Electrically conductive elements may include any suitable number and combination of electrical interconnection mechanisms, such as externally threaded posts 100, internally threaded posts 18, pins 204, and/or co-axial connectors 206. In one embodiment, electrically conductive elements are electrically coupled to electrical circuit 12, 108, 208, or 308 using surface mount and/or through-hole soldering techniques.

In act 404, other components, such as shroud 214, insulating spacer 218, potting material 220, and/or rigid support block 306 may be disposed in an appropriate location around the one or more electrically conductive elements. In one embodiment, components, such as shroud 214, insulating spacer 218, and/or rigid support block 306 are temporarily secured in an appropriate location relative to the electrically conductive elements using a suitable adhesive. In a particular embodiment of connector 200, shroud 214 may be partially filled with a potting material 220. In a particular embodiment of connector 300, cavities 314 in rigid support block 306 may be filled with a suitable potting material to bond and seal electrically conductive elements against rigid support block 306.

In act 406, composite structure 14, 104, 202, or 302 is formed around connector 10, 100, 200, or 300 and its associated electrical circuit 12, 108, 208, or 308. In an embodiment using a lay-up process, layers of composite material are laid-up around the connector 10, 100, 200, or 300 and electrical circuit 12, 108, 208, or 308 to form composite structure 14, 104, 202, or 302. This process may be continued until the two opposing surfaces of composite structure 14, 104, 202, or 302 encompass the connector 10, 100, 200, or 300 and electrical circuit 12, 108, 208, or 308. The layers of composite material may then be co-bonded together with the connector 10, 100, 200, or 300 and electrical circuit 12, 108, 208, or 308. In one embodiment, the layers of composite material may include low density structural sandwich core materials, other embedded electrical circuits, environmental barriers, and/or other functional components.

In act 408, final assembly and post-fabrication fabrication acts are performed on composite structure 14, 104, 202, or 302. In one embodiment, other sandwich constituents, such as core materials, laminates, and/or other electrical circuits may be bonded to composite structure 14, 104, 202, or 302 where applicable. In another embodiment, various portions, such as the edges of composite structure may be machined using known machining techniques to remove excess composite material. Certain embodiments incorporating connector 10, 100, 200, or 300 embedded in composite structure 14, 104, 202, or 302 may provide an advantage in that damage due to these typical machining techniques may be reduced.

In act 410, the process is completed and the composite structure 14, 104, 202, or 302 may be used in a normal manner. Modifications, additions, or omissions may be made to the previously described method without departing from the scope of the disclosure. The method may include more, fewer, or other acts. Some acts may be repeated more than once, while other may be skipped altogether.

Although the present disclosure and its advantages have been described in detail, it should be understood that various changes, substitutions, and alterations can be made therein without departing from the spirit and scope of this disclosure as defined by the appended claims.

What is claimed is:

1. A connector for a composite structure comprising: at least one electrically conducting element that is coupled to a node of an electrical circuit embedded in a composite structure having a first surface and an opposing second surface, the at least one electrically conducting element disposed essentially between the first surface and the second surface of the composite structure, the composite structure comprising alternately-deposited layers of composite material and a bonding agent, wherein the at least one electrically conducting element comprises a threaded metallic post.

2. The connector of claim 1, wherein the at least one electrically conducting element is maintained in rigid alignment relative to the composite structure by a rigid support block that is electrically non-conductive.

3. The connector of claim 2, further comprising a potting compound that bonds the plurality of electrically conducting elements to the rigid support block.

4. The connector of claim 1, wherein the electrical circuit comprises a printed circuit board having at least one metal trace, the at least one electrically conducting element being rigidly coupled to the at least one metal trace.

5. The connector of claim 1, wherein the at least one electrically conducting element is electrically coupled to the electrical circuit through a flexible wire.

6. The connector of claim 1, wherein the electrical circuit is selected from the group consisting of a radiation filter, a polarizer, an antenna, an embedded sensor, a lightning diverter, a static electro-motive force (EMF) diverter, a wick, a resistive heater, and a shield.

7. A connector for a composite structure comprising:
at least one electrically conducting element that is coupled to a node of an electrical circuit embedded in a composite structure having a first surface and an opposing second surface, the at least one electrically conducting element disposed essentially between the first surface and the second surface of the composite structure, the composite structure comprising alternately-deposited layers of composite material and a bonding agent, wherein the at least one electrically conducting element comprises a plurality of elongated pins that are essentially perpendicular to the first surface and the second surface, the connector further comprising a protective shroud that extends around the plurality of pins and disposed essentially between the first surface and the second surface, the protective shroud at least partially filled with a dielectric potting material.

8. The connector of claim 7, further comprising a coaxial connector.

9. A system comprising:
an electrical circuit comprising a plurality of traces;
a plurality of electrically conducting elements, each electrically conducting element electrically coupled to at least one of the plurality of traces, the plurality of electrically conducting elements selected from the group consisting of an internally threaded post, an externally threaded post, a pin, a pin receptacle, and a co-axial connector;
one or more additional components disposed proximate the plurality of electrically conducting elements, the one or more additional components selected from the group consisting of a shroud and a rigid support block; and
a radome formed around the electrical circuit and the plurality of electrically conducting elements using a lay-up process, the lay-up process comprising alternately depositing a plurality of layers of composite material on one another using a bonding agent, the radome having a first surface and an opposing second surface that essentially encompasses the electrical circuit and the plurality of electrically conducting elements.

10. A system comprising:
an electrical circuit;
at least one electrically conducting element electrically coupled to the electrical circuit; and
a composite structure formed around the electrical circuit and the at least one electrically conducting element using a lay-up process, the lay-up process comprising alternately depositing a plurality of layers of composite material on one another using a bonding agent, the composite structure having a first surface and an opposing second surface, the at least one electrically conducting element disposed essentially between the first surface and the second surface of the composite structure.

11. The system of claim 10, wherein the at least one electrically conducting element is electrically coupled to the electrical circuit using a threaded metallic post.

12. The system of claim 9, further comprising at least one conducting element disposed in a rigid support block that is electrically non-conductive, and wherein the composite structure is formed around the rigid support block.

13. The system method of claim 12, wherein the plurality of electrically conducting elements are bonded to the rigid support block using a potting compound.

14. The system of claim 10, further comprising a protective shroud disposed around a plurality of electrically conducting elements, and wherein the composite structure is formed around the protective shroud such that the protective shroud is between the first surface and the second surface.

15. The system of claim 14, wherein the protective shroud is at least partially filled with a dielectric potting material.

16. The system of claim 10, wherein the electrical circuit comprises at least one metal trace, and wherein the at least one electrically conducting element is rigidly coupled to the at least one metal trace.

17. The system of claim 10, wherein the electrical circuit is electrically coupled to a coaxial connector.

18. The system of claim 10, wherein the at least one electrically conducting element is electrically coupled to the electrical circuit through a flexible wire.

19. The system of claim 10, wherein the electrical circuit is selected from the group consisting of a radiation filter, a polarizer, an antenna, an embedded sensor, a lightning diverter, a static electro-motive force (EMF) diverter, a wick, a resistive heater, and a shield.

* * * * *